(12) United States Patent
Longhurst et al.

(10) Patent No.: US 7,889,994 B2
(45) Date of Patent: Feb. 15, 2011

(54) INSTALLATION FOR CONVEYING A FIRST PLURALITY OF ELECTRICAL SIGNALS CARRIED BY A FIRST TRIAXIAL CABLE TO A SECOND TRIAXIAL CABLE

(75) Inventors: Philip Longhurst, Ringmer (GB); Chris Hamblin, Worthing (GB); Gareth Foster, Shoreham-by-Sea (GB); Keith Jenkins, Cookham (GB); Gary Wordsworth, Stoke Poges (GB)

(73) Assignee: Interlemo Holding S.A., Ecublens (CH)

( * ) Notice: Subject to any disclaimer, the term of this patent is extended or adjusted under 35 U.S.C. 154(b) by 585 days.

(21) Appl. No.: 12/063,734

(22) PCT Filed: Aug. 21, 2006

(86) PCT No.: PCT/IB2006/002297

§ 371 (c)(1),
(2), (4) Date: Feb. 13, 2008

(87) PCT Pub. No.: WO2007/023367

PCT Pub. Date: Mar. 1, 2007

(65) Prior Publication Data

US 2010/0172648 A1 Jul. 8, 2010

(30) Foreign Application Priority Data

Aug. 24, 2005 (EP) .................................. 05018343

(51) Int. Cl.
*H04B 10/00* (2006.01)

(52) U.S. Cl. ...................................... 398/141; 398/110

(58) Field of Classification Search .......... 398/140–172
See application file for complete search history.

(56) References Cited

U.S. PATENT DOCUMENTS 4,019,048 A    4/1977   Maione et al.

(Continued)

FOREIGN PATENT DOCUMENTS

CN          1127056 A       7/1996

(Continued)

*Primary Examiner* — Agustin Bello
(74) *Attorney, Agent, or Firm* — Frommer Lawrence & Haug LLP; Ronald R. Santucci

(57) ABSTRACT

The present invention relates to an installation for conveying electrical signals carried by a first triaxial cable (1) to a second triaxial cable (18). It comprises: a first interface (15) between the first triaxial cable (1) and a fiber optic cable (9) and a second interface (16) between the fiber optic (9) cable and the second triaxial cable (18). A television camera (17) is connected to a remote camera control unit (14) via this installation. The first triaxial cable (1) connects CCU (14) with the interface (15). The interface (15) comprises an adapter converting electrical signals, conveyed by the triaxial cable (1), to optical signals. The fiber optic cable (9) transmits optical signals to the second interface (16). The interface (16) comprises an adapter converting optical signals to electrical signals. The second triaxial cable (18) transmits the electrical signals to the television camera (17). A mirror image of the adapters allows transmitting electrical signals from the camera (17) to the CCU (14).

16 Claims, 2 Drawing Sheets

U.S. PATENT DOCUMENTS

Figure 1:
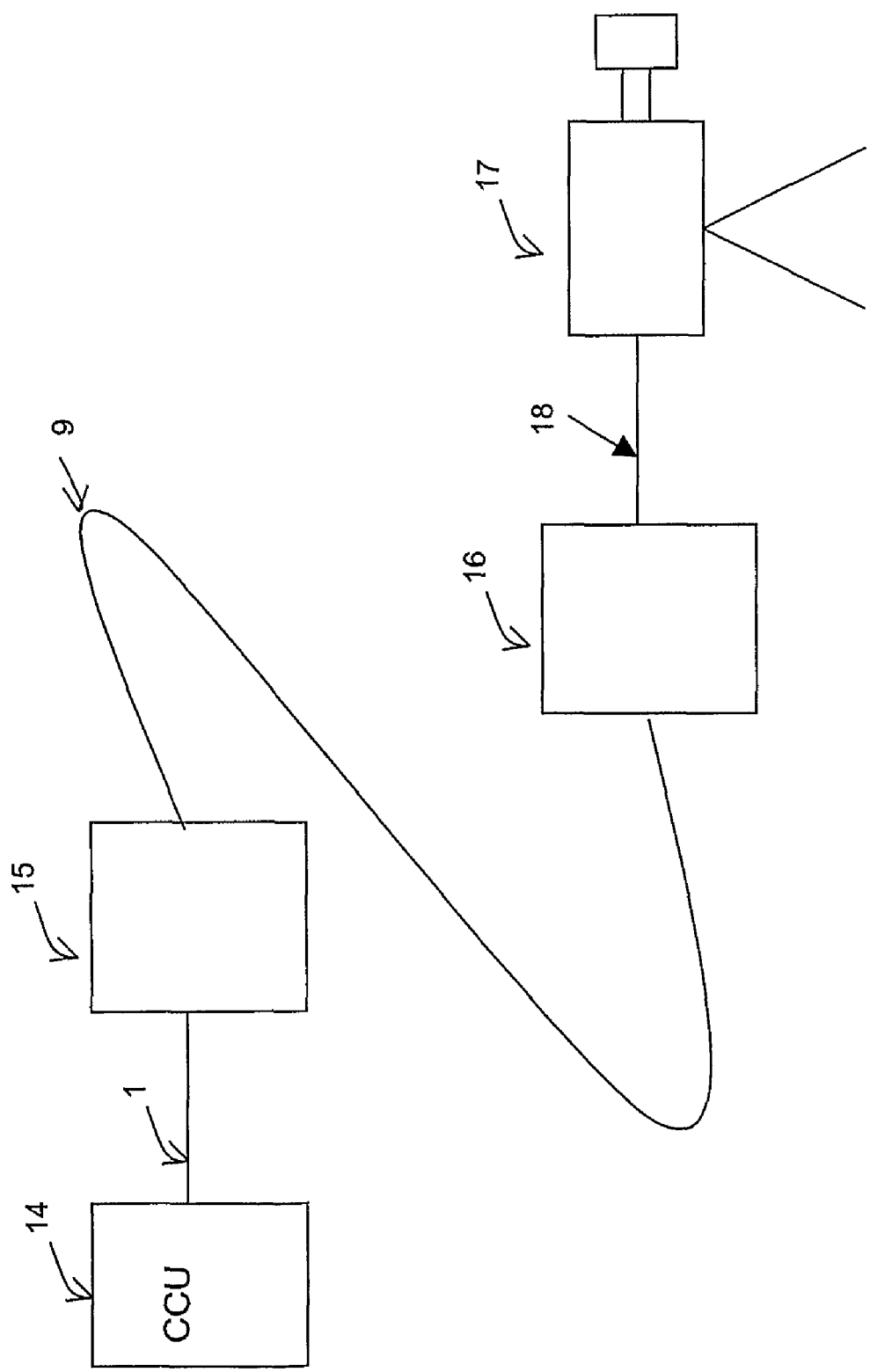

| | | | | |
|---|---|---|---|---|
| 4,695,127 | A * | 9/1987 | Ohlhaber et al. | 385/101 |
| 4,896,939 | A * | 1/1990 | O'Brien | 385/56 |
| 5,150,442 | A * | 9/1992 | Desmons | 385/101 |
| 5,557,698 | A * | 9/1996 | Gareis et al. | 385/101 |
| 5,572,348 | A * | 11/1996 | Carlson et al. | 398/71 |
| 5,579,060 | A * | 11/1996 | Elberbaum | 348/705 |
| 5,592,321 | A * | 1/1997 | Elberbaum | 398/45 |
| 6,115,159 | A * | 9/2000 | Baker | 398/1 |
| 6,343,172 | B1 * | 1/2002 | Schiestle et al. | 385/101 |
| 6,493,034 | B1 * | 12/2002 | Elberbaum | 348/512 |
| 6,665,497 | B1 * | 12/2003 | Hamilton-Gahart et al. | 398/135 |
| 6,686,538 | B2 * | 2/2004 | Yamamoto | 174/36 |
| 6,947,069 | B1 * | 9/2005 | Elberbaum | 348/50 |
| 7,197,205 | B1 * | 3/2007 | BuAbbud | 385/24 |
| 7,327,959 | B2 * | 2/2008 | Pelletier et al. | 398/139 |
| 7,798,725 | B2 * | 9/2010 | Khemakhem et al. | 385/75 |
| 2002/0025125 | A1 * | 2/2002 | Williams | 385/92 |
| 2010/0172648 | A1 * | 7/2010 | Longhurst et al. | 398/82 |

FOREIGN PATENT DOCUMENTS

| | | |
|---|---|---|
| EP | 1 011 217 A | 6/2000 |
| EP | 1011217 A | 6/2000 |
| EP | 1 512 235 B | 10/2005 |
| WO | WO 94/28690 A | 12/1994 |
| WO | WO 03/105372 A | 12/2003 |

* cited by examiner

INSTALLATION FOR CONVEYING A FIRST PLURALITY OF ELECTRICAL SIGNALS CARRIED BY A FIRST TRIAXIAL CABLE TO A SECOND TRIAXIAL CABLE

This application is a 371 of PCT/IB2006/002297 filed on Aug. 21, 2006, published on Mar. 1, 2007 under publication number WO 2007/023367 A1 which claims priority benefits from European Patent Application Number 05018343.3 filed Aug. 24, 2005, the disclosure of which is incorporated herein by reference.

The present invention relates to an installation for conveying a first plurality of electrical signals carried by a first triaxial cable to a second triaxial cable comprising a first adapter between the first triaxial cable and a first fibre optic cable and a second adapter between the first fibre optic cable and the second triaxial cable. The invention relates also to an installation for conveying electrical signals from the second triaxial cable to the first triaxial cable.

Such an installation is useful for conveying video, audio, and control data to and from a television camera. In many television recording situations the camera is remote from the camera control unit and the recording device. The camera may be on a studio floor while the control unit and recording device or vision mixing equipment is in a different room. During outside broadcasts the control unit is often in a van remote from where a scene is being played out. At some sports events for example race tracks there is a requirement for the camera to be a considerable distance from the broadcast room or the outside broadcast van. Video, audio, intercom, control and other data are sent to and from the camera. For example, the program video may be sent from the camera while viewfinder video is sent back.

Many manufacturers make cameras and control units connected by a triaxial cable. These suffer increasing signal degradation with the cable length. Others are made with fibre optic links which can cover greater ranges.

The prior art discloses apparatus to convert the electrical signals on a triaxial cable to optical signals to be transmitted via a fibre optic cable. A second apparatus converts the optical signals to electrical signals to be transmitted on another triaxial cable.

In the prior art, individual analogue signals are discriminated, for example by means of bandpass filters in the converter requiring a significant part of the converter circuitry to be designed specifically for one model of camera control unit. The optical signal is produced by analogue modulation which causes signal degradation. Despite the high bandwidth and low loss of optical cables the degradation increases with the length of the fibre.

The U.S. Pat. No. 4,019,048 discloses an apparatus allowing to improve the transmission characteristics of fibre optic installations i.e. to allow the digital signal to be sent over greater lengths of fibre optic cable. The apparatus described in U.S. Pat. No. 4,019,048 receives a signal which is already in digital optical form. It regenerates it after it has been degraded by tens of kilometers of fibre so that it can be retransmitted over a plurality of fibre optic cables. This is often used in submarine cables where extremely long distances of hundreds of kilometers are required. The apparatus described in U.S. Pat. No. 4,019,048 does not convert electrical signals to digital optical signals except where those electrical signals are an intermediate digital product of the process to regenerate the optical signal. Even if in a particular circumstance, the digital signal carried by the apparatus disclosed in U.S. Pat. No. 4,019,048 represented a plurality of electrical signals, these signals are not reconstructed at any point but are always represented in a digital form.

The EP 1 512 235 discloses an apparatus to transmit electrical signals as optical pulses through the atmosphere. The advantages of the apparatus disclosed in EP 1 512 235 are immunity to artificial and/or natural light interference while the invention disclosed in the present patent application is only intended for use over fibre optic links which do not suffer these interferences.

The present invention proposes to improve the prior art apparatus.

The installation according to the present invention is defined in claim 1.

The advantages of installation according to the present invention are the following:

Once the signal has been converted to digital there is no further significant degradation until the signal is converted back to analogue. The signal quality does not degrade when longer optical cables are used unless the maximum operating range is exceeded. The digital signal is not subject to degradation due to temperature drift or aging of the digital components.

According to an embodiment of the invention, the second adapter further comprises a plurality of digital filters each connected between one of the digital decoding circuits and one of the digital to analogue converters, each operating to further reduce the bandwidth of one of the digital representations of the filtered versions of the electrical signal.

According to another embodiment of the invention, the first adapter further comprises a plurality of digital filters each connected between one of the analogue to digital converters and the digital coding circuit, each operating to further reduce the bandwidth of one of the digital representations of the filtered versions of the electrical signal.

The advantages of digital filters are well known to skill in the field, they are more reproducible and lower cost than similar performance analogue filters. They can be designed to be linear phase giving very low pulse distortion. They do not suffer from temperature drift.

According to another embodiment of the invention, the output of one or more of the digital to analogue converters connected to the digital decoding circuit, represents more than one of the electrical signals carried on the first triaxial cable.

Removing the need to isolate or demodulate each of the electrical signals reduces the extent to which the circuit needs to be customised for each of the Camera Control Units with which it is to be used.

According to another embodiment of the invention, the output of one or more of the digital to analogue converters connected to the digital decoding circuit, represents one of the electrical signals carried on the first triaxial cable.

According to another embodiment the digital filters that are adjacent in frequency range are provided with complementary transition bands so that the combined response is constant and continuous. this means that the carrier frequencies used on the triaxial cable do not even have to fall neatly within a single digital filter pass band. This reduces further the need to design the circuitry for a given camera and control unit (CCU)

According to another embodiment of the invention, the digital filters are designed so that signals carried on the first triaxial cable are reproduced by the summing circuit regardless of their frequency provided only that they lie within a continuous range of frequencies.

This allows any signal carried on triaxial cable and within the operating frequency range of the adapter to be conveyed eliminating the need to customise the signal processing for the Camera Control Unit According to another embodiment of the invention, the digital filters are designed to be complementary so that the sum of the frequency response of the filters is constant across the operating frequency range.

This use of digital filters with complementary frequency responses reduces any frequency response ripple where the various filter responses overlap.

According to another embodiment of the invention, the installation comprises an automatic calibration circuit designed to adjust the amplitude of one or more of the analogue to digital converters to compensate for imbalances in the gains of the anti-alias filters, analogue to digital converters or their associated circuitry including drivers amplifiers and buffers.

This reduces the need for manual adjustment during manufacturing and subsequent drift due to temperature and aging.

According to another embodiment of the invention, the second adapter comprises a wavelength division multiplexer connected to the optical fibre and splitting the combined optical signal to connect to each of the second optical transducers.

Wavelength division multiplexing allows fewer optical fibres to be used to convey the signals.

According to another embodiment of the invention, the installation is designed for conveying a second plurality of electrical signals carried by the second triaxial cable to the first triaxial cable comprising a third adapter between the second triaxial cable and a second fibre optic cable and a forth adapter between the second fibre optic cable and the first triaxial cable, the third adapter being designed as the first adapter according to one of the claims 1, 3, 6, 7, 8, and 9 and the fourth adapter being designed as the second adapter according to one of the claims 1, 2, 4, 5, 6, 7 and 10 and in that the first and third adapters and the second and fourth adapters may not being of identical design.

The above installation allows a two-way communication between the devices connected at the ends of the triaxial cables. As the signals exchanged signals between the devices may not be identical, for example, the frequency response of the filters and sample rates of the analogue to digital converters of the third and first adapter may be different and the frequency response of the filters and sample rates of the digital to analogue converters of the second and fourth adapters may be different. In a two way installation the first and third adapters and the second and fourth adapters may not be of identical design.

According to another embodiment of the invention, the first and fourth adapters are connected to triaxial cable carrying electrical signals from and to a camera control unit (CCU) while the second and third adapters are connected to a triaxial cable carrying electrical signals to and from a television camera.

According to another embodiment of the invention, the fibre optic cable is a hybrid cable comprising two optical fibres and copper conductors, in that the first adapter is provided with a power diplexer fed by the first triaxial cable and designed to allow DC or AC power to flow to copper conductors for power supplying devices located at the distal end of the hybrid cable and/or of distal end of the second triaxial cable.

The above installation allows obtaining lightweight devices especially for camera and adapters close to the camera as it is not necessary to provide for batteries or other power supply.

The foregoing and other features and advantages of the invention will be apparent from the following description of the preferred embodiments of the invention, as illustrated in the accompanying drawings.

Figure 2:
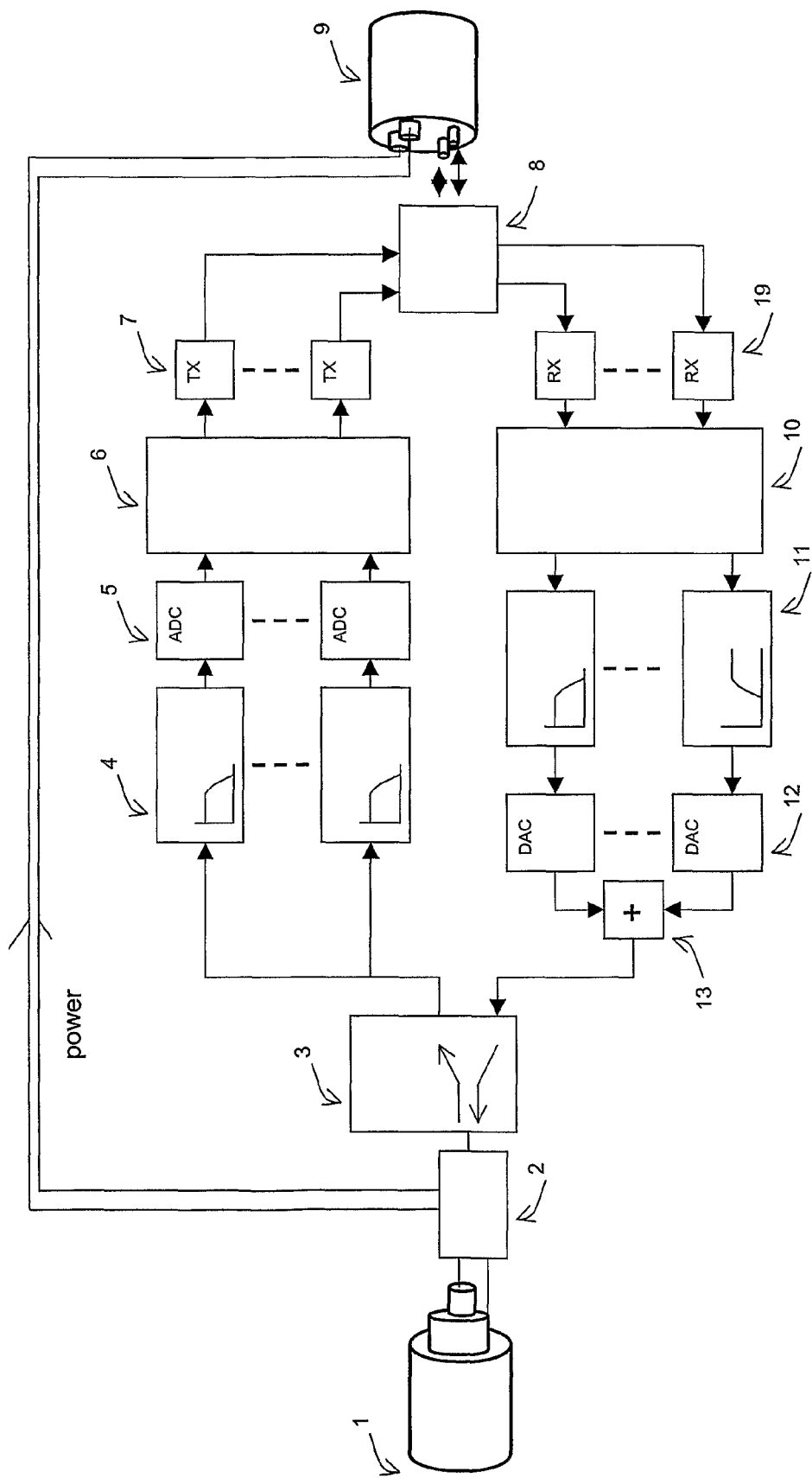

FIG. 1 is schematic view of the preferred embodiment of the present invention used with a television camera FIG. 2 shows the first and fourth adapter close to the Camera control unit (CCU) of FIG. 1

In the schematic view of FIG. 1 a television camera 17 is connected to a remote camera control unit (CCU) via an installation according to the present invention. A first triaxial cable 1 connects CCU 14 with an interface 15. The interface 15 comprises a first adapter converting electrical signals, conveyed by the triaxial cable 1, to optical signals. A fibre optic cable 9 transmits optical signals to a second interface 16. The interface 16 comprises a second adapter converting optical signals to electrical signals. A second triaxial cable 18 transmits the electrical signals to the television camera 17. The electrical signals emitted by the camera 17 are transmitted by the second triaxial cable 18 to the interface 16. The interface 16 comprises a third adapter converting the electrical signals to optical signals. The third adapter is a mirror image of the first adapter located in interface 15. The optical signals emitted by the third adapter are transmitted by the fibre optic cable 9 to the interface 15. The interface 15 comprises a fourth adapter converting the received optical signals to electrical signals conveyed by the first triaxial cable 1 to the CCU 14. The fourth adapter is a mirror image of the second adapter located in interface 16. As previously stated the first and third adapters and the second and fourth adapters may be of different design but according to one of the claims.

The interface 15 comprising the first and fourth adapter shown in FIG. 2 will be now described.

In the preferred embodiment of the invention shown in FIG. 2, the triaxial cable 1 is connected to a power diplexer 2. The power diplexer 2 optionally allows DC or AC power to flow to conductors in a hybrid fibre optic cable 9 while the higher frequency electrical signals carried on the first triaxial cable 1 are fed to a directional splitter/combiner 3

The upper portion of interface 15 comprising low pass filters 4, analogue to digital converters 5, digital processing block 6, optical transducers (TX) 7, is the first adapter. The lower portion comprising summing device 13, digital to analogue converters (DAC) 12, digital filters 11, digital processing block 10, receive optical transducers (RX) 19, is the fourth adapter.

A direction splitter/combiner 3 feeds electrical signals from the first triaxial cable 1 to the low pass filters 4 but does not allow signals from the digital to analogue converters (DAC) 12 to reach the low pass filters 4. The low pass filters 4 prevent aliasing in the analogue to digital conversion process. The digital representations of the electrical signals from the first triaxial cable 1 are fed to a digital processing block 6. In the preferred embodiment this block is implemented in a programmable logic device. The individual streams, are multiplexed, have redundant coding applied and are then converted into serial streams to feed to the optical transducers (TX) 7. The optical transducers 7 convert the serial digital signals into an optical signal.

In another preferred embodiment a single optical transducer of sufficient bandwidth may be used. In the preferred embodiment, the optical outputs of the transducers 7 are combined in an optical multiplexing/demultiplexing device 8 which sums the optical outputs from different wavelength transducers. The optical multiplexing/demultiplexing device 8 also receives optical signals from the optic fibre cable 9 and separates them. A preferred embodiment of the optical multiplexing/demultiplexing device 8 comprises directional couplers and wavelength discriminators.

The demultiplexed optical signals from the fibre optic cable 9 are fed to the receive optical transducers 19 which reproduce the serial digital signal. In the preferred embodiment these are fed to a digital processing block 10 that deserialises, decodes and demultiplexes the data. In the preferred embodiment, the demultiplexed data is fed to digital filters 11 which define the operating frequency range of the ADCs 5 and DACs 12. In another preferred embodiment of the design two or more digital filters 11 are used whose frequency responses sum to a constant amplitude across the operating frequency range of the apparatus.

Another preferred embodiment of the invention uses one optical fibre for each of the optical transducers 7 and 19.

In the preferred embodiment of the invention the digital to analogue converters 12 each comprises a digital converter and a reconstruction filter.

The reconstructed analogue signals are summed 13 and fed to the directional combiner/splitter 3. This feeds the summed electrical signal to the first triaxial cable 1 but not the anti-alias filters 4.

In the preferred embodiment (FIG. 1) an interface 15 of the type shown in FIG. 2, an embodiment of which is described above, is connected to the camera control unit 14 by a first triaxial cable 1. The 1 fibre optic cable 9 from the interface 14 is fed to another similar interface 16 connected to the camera 17 by a second triaxial cable 18.

If the camera control unit 14 provides power, it is fed via the first triaxial cable 1, via the power diplexer 2 in the interface 15 near the control unit 14, via the conductors in an hybrid fibre optic cable 9 via the power diplexer 2 in the interface 16 near the camera 17, via the second triaxial cable 18 to the camera. In this case power supply for interface 16 and camera 17 is not necessary. Depending of the distance between the CCU and the camera the interface 16 and camera may be powered by conventional battery packs or similar to avoid power drop due to copper cable resistance.

The invention claimed is:

1. Installation for conveying a first plurality of electrical signals carried by a first triaxial cable to second triaxial cable comprising a first adapter between the first triaxial cable and a first fibre optic cable and a second adapter between the first fibre optic cable and the second triaxial cable, wherein the first adapter comprises:
    a plurality of low pass anti-alias filters each designed to produce a filtered version of the electrical signals,
    a plurality of analogue to digital converter circuits each connected to one of the low pass anti-alias filters, designed to produce a digital representation of each of the filtered versions of the electrical signals,
    a first digital coding circuit connected to each of the analogue to digital converter circuits, that produces a plurality of digital signals each representing a subset of the digital representations of the electrical signals,
    a plurality of first optical transducers each of which is designed to convert one of the digital electrical outputs from the digital coding circuit to a digital optical signal,
    in that the first fibre optic cable is connected to the first optical transducers and comprises at least one optical fibre, in that the second adapter comprises:
    a plurality of second optical transducers connected to the fibre optic cable, each of which is designed to convert one of the digital optical signals produced by the first optical transducers and transmitted by the first optic cable to a digital electrical signal,
    a plurality of digital decoding circuits each fed from one of the optical transducers and reproducing a digital representation of one of the filtered versions of the electrical signals,
    a plurality of digital to analogue converter circuits each connected to one of the digital decoding circuits and each being designed to reproduce a filtered version of the electrical signals,
    a summing circuit combining the reproduced filtered versions of the electrical signals to reproduce the electrical signals carried by the first triaxial cable,
    and in that the output of one or more of the digital to analogue converters connected to the digital decoding circuitry, represents more than one of the electrical signals carried on the first triaxial cable.

2. Installation according to claim 1, wherein the second adapter further comprises a plurality of digital filters each connected between one of the digital decoding circuits and one of the digital to analogue converters, each operating to further reduce the bandwidth of one of the digital representations of the filtered versions of the electrical signal.

3. Installation according to claim 1, wherein the first adapter further comprises a plurality of digital filters each connected between one of the analogue to digital converters and the digital coding circuits, each operating to further reduce the bandwidth of one of the digital representations of the filtered versions of the electrical signal.

4. Installation according to claim 2, wherein the digital filters that are adjacent in frequency range are provided with complementary transition bands so that the combined response is constant and continuous.

5. Installation according to claim 1, wherein the output of one or more of the digital to analogue converters connected to the to the digital decoding circuitry represents one of the electrical signals carried on the first triaxial cable.

6. Installation according to claim 2, wherein the digital filters are designed so that signals carried on the first triaxial cable are reproduced by the summing circuit regardless of their frequency provided only that they lie within a continuous range of frequencies.

7. Installation according to claim 6, wherein the digital filters are designed to be complementary so that the sum of the frequency response of the filters is constant across the operating frequency range.

8. Installation according to claim 1, wherein it comprises an automatic calibration circuit designed to adjust the amplitude of one or more of the analogue to digital converters to compensate for imbalances in the gains of the anti-alias filters, analogue to digital converters or their associated circuitry including drivers amplifiers and buffers.

9. Installation according to claim 1, wherein the first adapter comprises an optical combiner summing the optical signals from the first optical transducers so that they may be conveyed on a single optical fibre.

10. Installation according to claim 9, wherein the second adapter comprises a wavelength division multiplexer connected to the optical fibre and splitting the combined optical signal to connect to each of the second optical transducers.

11. Installation according to claim 1, wherein the installation is designed for conveying a second plurality of electrical signals carried by the second triaxial cable to the first triaxial cable comprising a third adapter between the second triaxial cable and a second fibre optic cable and a forth adapter between the second fibre optic cable and the first triaxial cable, the third adapter being designed as the first adapter according to claim 1 and the fourth adapter being designed as the second adapter according to claim 1 and in that the first and third adapters and the second and fourth adapters may not being of identical design.

12. Installation according to claim 11, wherein the frequency response of the filters and sample rates of the analogue to digital converters of the third and first adapter are different and the frequency response of the filters and sample rates of the digital to analogue converters of the second and fourth adapters are different.

13. Installation according to claim 11, wherein the first and fourth adapters respectively the second and the third adapters are enclosed in two different housings provided with input and output ends connected to the triaxial and fibre optic cables.

14. Installation according to claim 11, wherein the first and fourth adapters are connected to triaxial cable carrying electrical signals from and to a camera control unit (CCU) while the second and third adapters are connected to a triaxial cable carrying electrical signals to and from a television camera.

15. Installation according to one of claim 11, wherein the fibre optic cable is a hybrid cable comprising two optical fibres and copper conductors, in that the first adapter is provided with a power diplexer fed by the first triaxial cable and designed to allow DC or AC power to flow to copper conductors for power supplying devices located at the distal end of the hybrid cable and/or of distal end of the second triaxial cable.

16. Installation according to claim 11, wherein the first and fourth adapters respectively the second and the third adapters are coupled to the ends of a single optical fibre by means of wavelength division multiplexers or directional couplers.

\* \* \* \* \*